(12) United States Patent
Feichtenschlager et al.

(10) Patent No.: US 7,879,178 B2
(45) Date of Patent: Feb. 1, 2011

(54) METHOD OF PRODUCING HOLLOW PLASTIC COMPONENTS

(75) Inventors: Nikolaus Feichtenschlager, Braunau (AT); Andreas Junger, Franking (AT); Christian Auzinger, St. Peter/Hart (AT); Philipp Seidl, St. Peter/Hart (AT); Erich Katzlberger, Mettmach (AT); Leopold Eisterlehner, Steinbach/Stayr (AT); Hannes Zaleschak, Ansfelden (AT)

(73) Assignees: Lisa Draexlmaier GmbH, Vilsbiburg (DE); Bayerische Motoren Werke Aktiengesellschaft, Munich (DE)

( * ) Notice: Subject to any disclaimer, the term of this patent is extended or adjusted under 35 U.S.C. 154(b) by 588 days.

(21) Appl. No.: 11/584,353

(22) Filed: Oct. 20, 2006

(65) Prior Publication Data

US 2007/0089830 A1 Apr. 26, 2007

(30) Foreign Application Priority Data

Oct. 21, 2005 (DE) .................. 10 2005 050 570

(51) Int. Cl.
 *B29C 65/20* (2006.01)
(52) U.S. Cl. .................. 156/304.2; 156/304.6
(58) Field of Classification Search .............. None
 See application file for complete search history.

(56) References Cited

U.S. PATENT DOCUMENTS

| | | | | |
|---|---|---|---|---|
| 1,974,337 | A * | 9/1934 | Magnani | 156/245 |
| 3,276,941 | A | 10/1966 | Burns | |
| 4,390,384 | A | 6/1983 | Turner | |
| 4,450,038 | A * | 5/1984 | Ishii et al. | 156/497 |
| 4,767,298 | A | 8/1988 | Bocchicchio et al. | |
| 5,443,098 | A * | 8/1995 | Kertesz | 138/109 |
| 6,001,301 | A * | 12/1999 | Kinoshita et al. | 264/510 |
| 6,135,158 | A * | 10/2000 | Kraus | 138/109 |
| 6,234,132 | B1 | 5/2001 | Kopec et al. | |
| 6,267,093 | B1 | 7/2001 | Lohr | |
| 6,540,868 | B1 | 4/2003 | Kertesz | |

FOREIGN PATENT DOCUMENTS

| | | |
|---|---|---|
| DE | 39 06278 A1 | 8/1990 |
| DE | OS19701118 A1 | 7/1998 |
| DE | 199 53 746 C2 | 4/2003 |

\* cited by examiner

*Primary Examiner*—Richard Crispino
*Assistant Examiner*—Barbara J. Musser
(74) *Attorney, Agent, or Firm*—Wolf, Greenfield & Sacks, P.C.

(57) ABSTRACT

A method of producing hollow plastic components, such as for air conduction in internal combustion engines, in which two or more molded or hollow body members are manufactured using injection molding technology, are thereupon brought together and are joined together using plastic welding technology.

12 Claims, 2 Drawing Sheets

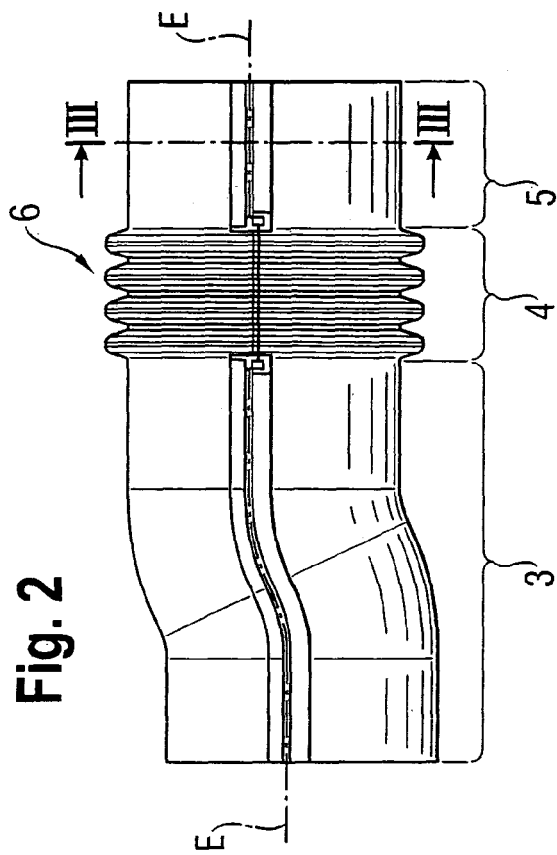
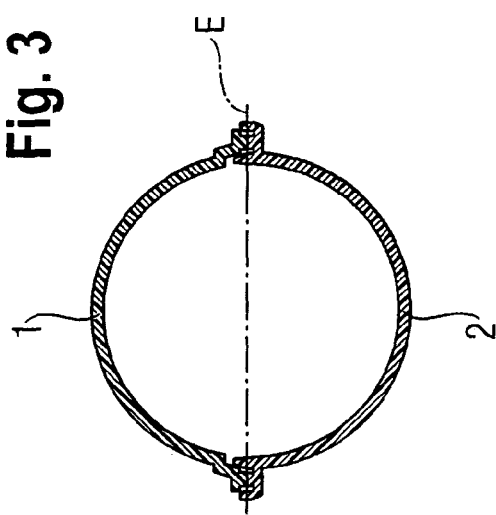
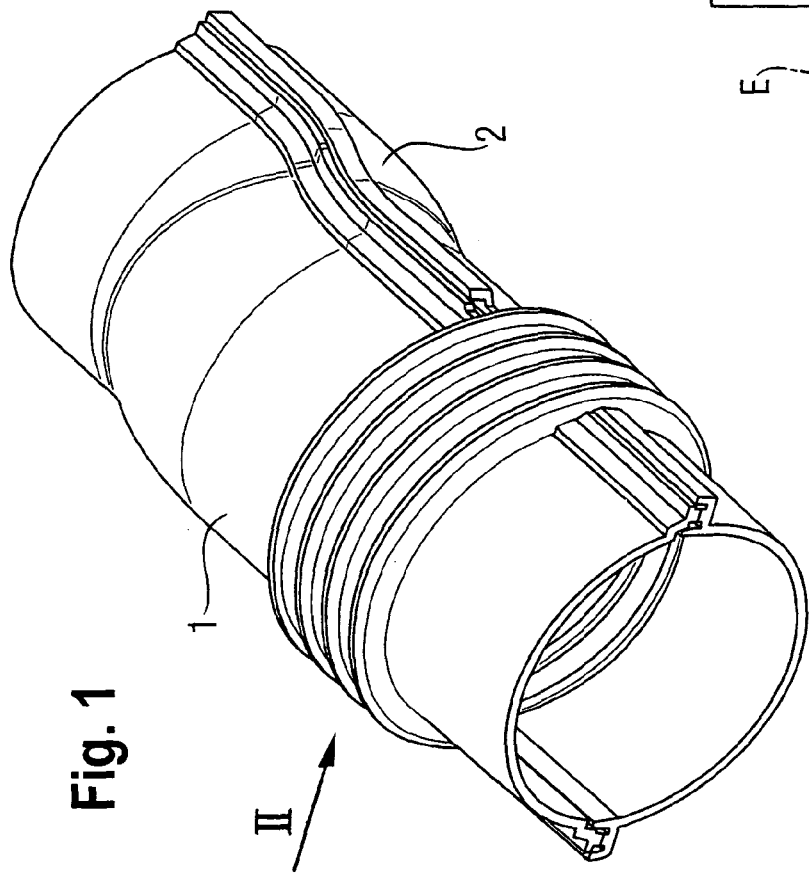

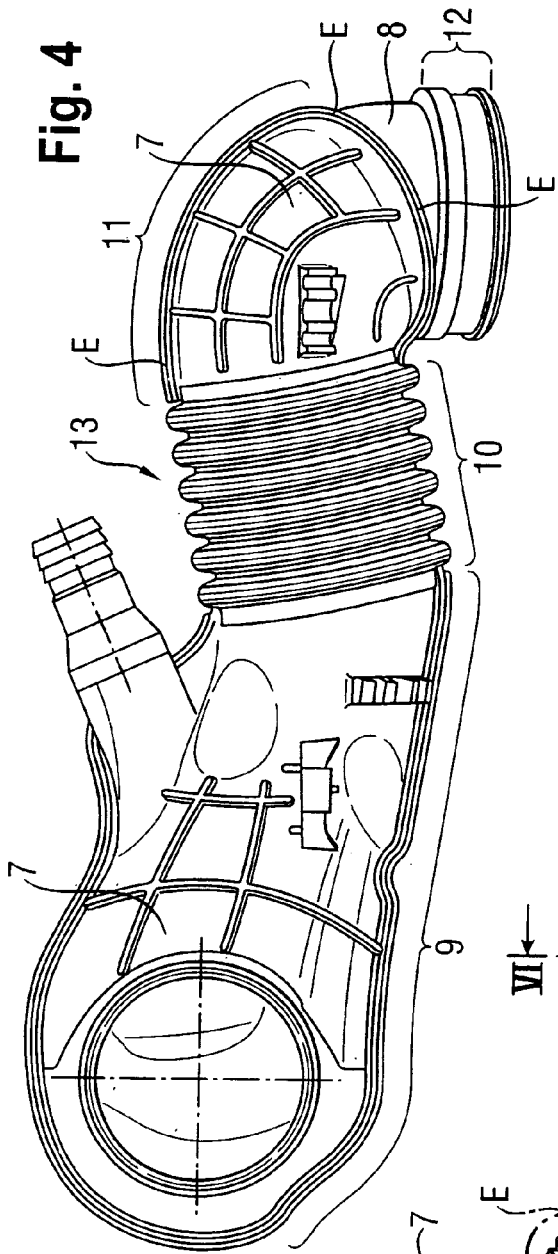
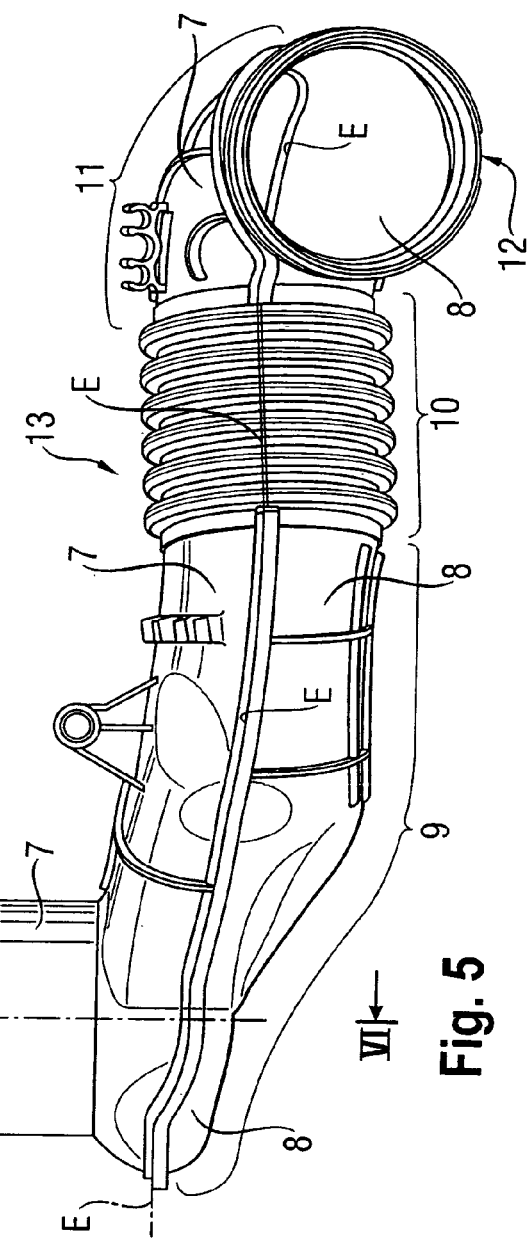
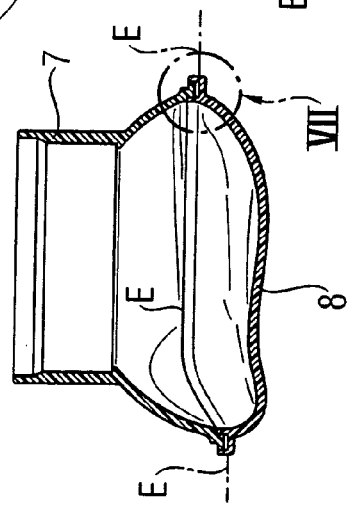
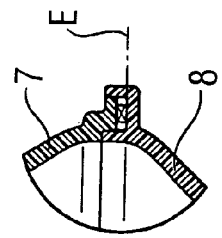

METHOD OF PRODUCING HOLLOW PLASTIC COMPONENTS

CROSS REFERENCE TO RELATED APPLICATION

Foreign priority benefits are claimed under 35 U.S.C. §119 (a)-(d) or 35 U.S.C. §365(b) of German Application No. DE 10 2005 050 570.8, filed Oct. 21, 2005, which is hereby incorporated by reference in its entirety.

BACKGROUND

1. Field

Aspects of the present invention relate to a method for producing hollow plastic components, and more particularly to a method for producing hollow plastic components for use in vehicles.

2. Discussion of Related Art

Hollow plastic component parts are often used for air conduction in vehicles, such as in intake manifolds, intake manifold modules, connection pipes between turbo chargers and internal combustion engines, filtering tubes, and the like. Often, these components are made of thermoplastic material and are formed either through blow molding techniques, lost core techniques, or injection molding techniques.

One known technique for forming plastic components is described in DE OS 197 01 118. This method involves injection molding half shell components and then joining the half shells together using plastic welding techniques. Forming plastic components with such an approach provides for a variety of design options, and may result in a sturdy molded plastic component. These prior art techniques, however, have been limited to the use of a common material for each of the half shell components.

Tubes that connect turbo chargers to internal combustion engines are often subject to movement, as due to physical movement between the parts that are connected to the tube, or even due to thermal expansion and/or contraction of the tube itself. To accommodate this movement, prior art tubes often included bellows. Bellows may also prevent or reduce vibration and/or sound transmission.

Present manufacturing techniques are incapable of effectively forming complex hollow components from multiple types of plastic material. Although blow molding technology has been used to form components with both hard and soft plastic materials, these techniques can only be used to form simple shapes. Hollow bodies with complex shapes, undercuts, shoulders, and/or laterally projecting portions cannot be manufactured through blow molding techniques. Injection molding techniques also have drawbacks, as separate manufacture is required of each of the different materials, which are subsequently welded together through a complicated welding process.

SUMMARY

In one embodiment, a method is disclosed for producing hollow plastic components in which two subcomponents are injection molded and are thereafter brought together to be joined by a plastic weld. The method comprises molding two subcomponents using a multi-component injection molding technique. Each of the two subcomponents having two portions each made from a different material. Simultaneously the two portions of the two subcomponents are brought to melting temperature prescribed for each of the two portions. The melting occurs at joining portions of each of the two subcomponents. The joining portions of the two subcomponents are brought together. Pressure is applied between the joining portions of the two subcomponents.

In one embodiment, a method is disclosed for producing a hollow plastic component. The method comprises molding a first subcomponent having a first seam that includes a first section made of a first material and a second section made of a second material. The first material has a first melting temperature and the second material has a second melting temperature different than the first melting temperature. The method also comprises molding a second subcomponent having a second seam that includes a third section comprising the first material and that is configured to mate with the first section and a fourth section comprising the second material and that is configured to mate with the second section. The first and third section are heated to the first melting temperature. The second and fourth section are heated to the second melting temperature. The first section is positioned in contact with the third section and the second section is positioned in contact with the fourth section. Pressure is applied between the first and third section and between the second and fourth section to join the first component to the second component.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

Various embodiments of the invention will now be described, by way of example, with reference to the accompanying drawings, in which:

FIGS. 1-3 show a first embodiment of a molded hollow plastic component that includes a bellows; and FIGS. 4-7 show a second embodiment of a complex molded hollow plastic component that is also provided with a bellows.

DETAILED DESCRIPTION

The applicants have appreciated that there is a present need for hollow plastic components that incorporate different materials, such as materials that have different thermal properties, expansion properties optical properties, and/or different resistances to various media. The applicants have also appreciated that there is a need to combine hard and soft plastic materials together into a common component.

In one illustrative embodiment, a method is provided that allows hollow plastic components to be formed from multiple molded subcomponents that each comprise different materials. The subcomponents can be joined together through a welding process to form a component part, including but not limited to component parts that have complex shapes.

In some embodiments, two or more subcomponents are joined together along a seam to form a hollow plastic component part, such as an air tube. Each of the subcomponents, and the corresponding seam of the subcomponent, may have sections made of different materials. The seams may be configured such that, when the subcomponents are mated together, sections of each seam are mated to a corresponding section of a like material.

The different materials of a component may have different characteristics, such as different melting points, and the like. Plastic welding techniques that may be used to join the subcomponents together often involve heating seams of the subcomponents to melting point. Accordingly, subcomponents that include different materials may require heating to different melting temperatures. After seam sections of the subcomponent are heated to the appropriate melting temperature, the seams may be pressed together to form the hollow plastic component.

In one illustrative embodiment, subcomponents are made through multi-component injection molding techniques. These techniques may be used to form subcomponents with sections that are made of different materials, however other suitable techniques for forming subcomponents of different materials may be employed, as the present invention is not limited in this regard. Joints between different materials within a common subcomponent may be formed in an efficient and effective manner using multi-component injection molding techniques. Moreover, joining different materials to one another during the subcomponent manufacturing process may simplify the assembly of the subcomponents to one another, where according to some embodiments, only like materials are joined to one another.

According to some illustrative embodiments of the invention, sections of seams made from different materials are simultaneously heated to the appropriate melting point. Subsequently, the subcomponents may be pressed together in a single step to complete the plastic welding operation. Overall assembly time of the component part may be reduced by heating the seams simultaneously and then pressing the seams together in a single step. Additionally, each section of the seam can be heated to the proper temperature in an efficient manner.

In some illustrative embodiments, seam sections of each subcomponent are configured to engage seam sections of a mating component that are made of a similar material. In this respect, the process of welding subcomponents made of different materials may be simplified. In some embodiments, different seam sections of a common subcomponent are heated to different melting temperatures, which allows each section to be heated to an optimum temperature for joining the components together.

According to some illustrative embodiments, components are configured such that the seams between the subcomponents may be positioned together by one or both of the subcomponents being moved in a single linear direction. Once the subcomponents are joined together, a force applied in a single direction, such as in the direction along which the parts are brought together, may be used to press seams of the components against one another. In this respect, the subcomponents may be assembled together in a more efficient and effective manner. Seams configured in this manner may also provide improved access to the seams for heating. By way of example, heating elements may also move along the direction in which the components are brought together and into contact with the entire seam for heating. Additionally, subcomponents configured in this manner may be pressed together, during a plastic welding process, in a single step, instead of the multiple steps that may be required for different configurations.

After heating, the subcomponents are pressed together to join the heated seams to one another and to form the hollow plastic component. In some embodiments, the components are pressed together while the seams are being heated, although this is not required, as in other embodiments the heating occurs prior to the seam sections being pressed together.

According to some embodiments, a fixture may be used to heat and/or press the components together. One such fixture is described in patent application filed on the same date herewith under 11/584,815, under Express Mail No. EV743785804US, which is hereby incorporated by reference in its entirety.

Turn now to the figures and initially FIGS. 1-3, which show various views of a hollow plastic component formed of subcomponents having different materials.

FIGS. 1-3 show a hollow plastic component formed of two subcomponent halves 1 and 2. The subcomponent halves 1 and 2 are manufactured separately, such as through a multi-component injection molding process, although other suitable manufacturing processes may be employed, as the present invention is not limited in this regard. Each of the subcomponent halves 1 and 2, have a first section 3 made of hard plastic, a second section 4 made of soft plastic and that includes bellows 6, and a third section 5 made of hard plastic. In the illustrated embodiment, sections 3 and 5 are made of a similar plastic material although not all embodiments are required to have such a construction, as the invention is not limited in this respect.

As shown in FIGS. 1-3, the mating seams of the first and second halves 1 and 2 extend substantially along a plane E. Plane E is configured such that a force applied in a single direction, such as a direction that is perpendicular to plane E, may be used to apply pressure between the seams of subcomponent halves 1 and 2 at all points. As shown, the seams may exhibit a curvature in various different directions and still be considered as lying in plane E.

In some embodiments, as described herein, the seam of subcomponent halves 1 and 2 may be melted simultaneously to an appropriate melting temperature for the material that comprises each of sections 3, 4, and 5. After heating the seam, subcomponent halves 1 and 2 may be brought into contact with one another by being moved toward one another in a linear direction, such as a direction that is generally perpendicular to plane E. In some embodiments, the seam may be heated while the subcomponent halves are in contact with one another. Once the subcomponents seams are heated and in contact with one another, pressure is applied to the seam to complete the plastic welding process and to form the hollow plastic component part.

Turn now to FIGS. 4-7, which show an exemplary complex hollow plastic body according to one illustrative embodiment. This particular illustrated plastic hollow body may be used as an air intake pipe in a vehicle. FIG. 4 shows the top view of the pipe, FIG. 5 shows the sideview of the pipe, FIG. 6 shows a section taken across plane VI-VI of FIG. 5 and FIG. 7 shows a detail view of the section noted VII in FIG. 6.

Much like the embodiment of FIGS. 1-3, the embodiment of FIGS. 4-7 is made from two subcomponents—namely two subcomponent halves 7 and 8. The subcomponent halves may be manufactured separately, such as through a multi-component injection molding process. Each subcomponent half 7 and 8 comprises a first section 9 and a third section 11 each made of a hard plastic material. A second section 10 that includes a bellows 13 is positioned between the first 9 and third section 11. Additionally, a fourth section 12 that includes a connecting section is positioned adjacent to the third section and is made of a soft plastic material. The connecting section may form a flexible sleeve for connecting the component to a mating pipe (not shown).

As illustrated in FIGS. 4-5, the seam that lies between connecting points of the half sections 7 and 8 extends along plane E, much like the embodiment of FIGS. 1-3. The seam does not extend into the connecting portion 12, but rather forms a continuous loop that runs through each of the first, second, and third sections 9, 10, and 11. In this regard, the connecting section 12, which may be formed as a part of subcomponent 8 during a multi-component injection molding process, may not be interrupted by a weld.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. A method of producing hollow plastic components in which two subcomponents are injection molded and are thereafter brought together to be joined by a plastic weld, the method comprising:

molding two subcomponents using a multi-component injection molding technique, each of the two subcomponents having two joining portions each made from a different material having different melting temperatures, at least one of the two joining portions of each of the two subcomponents including part of a bellows that are configured to mate with one another along seams that lie across corrugations of the bellows;

placing a heating element in contact with the joining portions of the two subcomponents;

simultaneously melting the two joining portions of the two subcomponents, that are initially below the melting temperatures of each material, by heating the two joining portions of the two subcomponents to the melting temperatures prescribed for each of the materials of the two joining portions, the melting occurring at the joining portions of each of the two subcomponents, including the seams of the parts of the bellows;

bringing the joining portions of the two subcomponents together; and applying a pressure between the joining portions of the two subcomponents.

2. The method according to claim 1, wherein the joining portions are disposed in a plane that extends substantially throughout an entire length of the hollow plastic component.

3. The method according to claim 2, wherein the plane is formed by a uniform plane that extends substantially along an axis of the hollow plastic component.

4. The method according to claim 2, wherein the plane is curved.

5. A method of producing a hollow plastic component, the method comprising:

molding a first subcomponent having a first joining portion that includes a first section made of a first material and a second section made of a second material, the first material having a first melting temperature and the second material having a second melting temperature different than the first melting temperature, at least one of the first and second sections including a first part of a bellows;

molding a second subcomponent having a second joining portion that includes a third section comprising the first material and that is configured to mate with the first section and a fourth section comprising the second material and that is configured to mate with the second section, at least one of the third and fourth sections including a second part of the bellows, the first and second parts of the bellows configured to mate with one another along seams that lie across corrugations of the bellows;

placing a heating element in contact with the first and second joining portions;

simultaneously heating the first and third sections, initially below the first melting temperature, to the first melting temperature, and the second and fourth sections, initially below the second melting temperature, to the second melting temperature, different than the first melting temperature;

positioning the first section in contact with the third section and positioning the second section in contact with the fourth section; and applying pressure between the first and third sections and between the second and fourth sections to join the first component to the second component.

6. The method according to claim 5, wherein the first and second subcomponents are each formed in a multi-component injection molding process.

7. The method according to claim 5, wherein heating the first and third sections to the first melting temperature and heating the second and fourth sections to the second melting temperature occurs prior to positioning the first section in contact with the third section and positioning the second section in contact with the fourth section.

8. The method according to claim 5, wherein positioning comprises moving the first subcomponent in a linear direction toward the second subcomponent.

9. The method according to claim 8, wherein applying pressure comprises applying a force in a direction parallel to the linear direction.

10. The method according to claim 5, wherein the first and second joining portions are each continuous and are configured to mate with one another.

11. The method according to claim 5, wherein the first and second joining portions each comprises a discontinuity.

12. The method according to claim 5, wherein the first joining portion comprises an additional section made of a third material different than the first and second materials, the additional section configured to mate with an additional section of the second joining portion that is also made of the third material.

* * * * *